US008112506B2

(12) United States Patent
Son et al.

(10) Patent No.: US 8,112,506 B2
(45) Date of Patent: Feb. 7, 2012

(54) SYSTEM AND METHOD FOR AUTOMATICALLY SETTING UP CONFIGURATIONS OF HOME NETWORK

(75) Inventors: Young-Sung Son, DaeJeon (KR); Jun-Hee Park, DaeJeon (KR); Kyeong-Deok Moon, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 752 days.

(21) Appl. No.: 12/177,629

(22) Filed: Jul. 22, 2008

(65) Prior Publication Data

US 2009/0083401 A1 Mar. 26, 2009

(30) Foreign Application Priority Data

Sep. 20, 2007 (KR) ........................ 10-2007-0095662

(51) Int. Cl.
*G06F 15/16* (2006.01)
*G06F 15/173* (2006.01)

(52) U.S. Cl. ........................................ 709/220; 709/223

(58) Field of Classification Search .................. 709/203, 709/223–226, 220
See application file for complete search history.

(56) References Cited

U.S. PATENT DOCUMENTS 5,771,381 A * 6/1998 Jones et al. ................... 713/100
5,826,000 A 10/1998 Hamilton
6,262,726 B1 * 7/2001 Stedman et al. .............. 715/745
6,512,526 B1 * 1/2003 McGlothlin et al. .......... 715/762
6,571,245 B2 * 5/2003 Huang et al. ......................... 1/1
6,721,881 B1 * 4/2004 Bian et al. ......................... 713/1
6,728,750 B1 * 4/2004 Anderson et al. ............. 709/201
7,024,471 B2 * 4/2006 George et al. ................. 709/222
7,039,858 B2 * 5/2006 Humpleman et al. ........ 715/205
7,530,024 B2 * 5/2009 Takahashi et al. ............ 715/763

FOREIGN PATENT DOCUMENTS

KR 10-2005-0100743 10/2005
KR 10-0653084 11/2006
WO 2006/061179 A1 6/2006

OTHER PUBLICATIONS

Korean Office Action issued on Mar. 30, 2009 in corresponding Korean Patent Application 10-2007-0095662.
Notice of Allowance issued Jul. 24, 2009 in corresponding Korean Application No. 10-2007-0095662.

* cited by examiner

*Primary Examiner* — Hussein A. Elchanti
(74) *Attorney, Agent, or Firm* — Staas & Halsey LLP

(57) ABSTRACT

Provided are a system and method for automatically setting up configurations of a home network. The system includes a setting information manager, placed within an individual home, for collecting and managing setting information associated with configurations of the home network. The setting information manager shares the setting information with a remote setting information management server or another setting information manager. Since customized setting information of an individual home is shared, setting information of home network configurations can be effectively managed, thereby reducing costs and efforts required for maintenance and repair of the home network.

13 Claims, 7 Drawing Sheets

SYSTEM AND METHOD FOR AUTOMATICALLY SETTING UP CONFIGURATIONS OF HOME NETWORK

CROSS-REFERENCE TO RELATED APPLICATIONS

This application claims priority under 35 U.S.C. §119 to Korean Patent Application No. P2007-95662, filed on Sep. 20, 2007, the disclosure of which is incorporated herein by reference in its entirety.

BACKGROUND OF THE INVENTION

1. Field of the Invention

The present disclosure relates to a system and method for automatically setting up configurations of a home network, and more particularly, to a system and method for automatically setting up configurations of a home network capable of automatically setting necessary setting information by sharing setting information associated with home-network configurations of a setting information management server or an individual home.

This work was supported by the IT R&D program of MIC/IITA [Work Management Number: 2006-S-066-02, Work Name: a development of ubiquitous home adaptive middleware with high-reliability]

2. Description of the Related Art

A home network management system refers to a system that controls a personal computer (PC), a peripheral device, a mobile phone, and a home appliance in a home by connecting them to a single network.

The range of an early home network management system was merely a home control system and home automation for automatic control of security, lighting, temperature and so on in a home.

Recent increase in number of households each having several PCs and peripheral devices has led to emergence of a networking technology that connects and integratedly manages those devices. Such a technology is called a home networking kit, and thus the concepts and techniques of a home network system begin to draw much attention.

In detail, a transmission medium has rapidly evolved from a related-art telephone line, a power line, or a wireless medium to the access network type of very high speed broadband Internet such as a digital subscriber line (DSL) and a cable modem. Also, the devices have been expanded to various digital information terminals including personal digital assistants (PDAs), portable multimedia players (PMPs) and mobile devices besides PCs.

The home networking system may serve as a path through which data can be exchanged between digital information appliances within the home, and also as a path through which intelligent communication can be provided via the external Internet network.

Using the home network system allows a user to access a system constructed in a home via the Internet or a telephone line from the outside as well as from the inside to thereby control electronic appliances such as a computer, a digital television, a digital video player, and an air conditioner.

A PC is a representative system that is generally used by a plurality of users, and the users can relatively easily learn and use its settings because an operating system for installation and a device for interface are limited.

In contrast, the home network management system is a large-scale system wherein various devices connected by various networks provide various application services. For this reason, it is difficult for an individual user to manually install all the configurations thereof.

Thus, providers of the home network management system manually install a device, a network, an application service, and the home network management system that manages them. Alternatively, the provider stores associated setting information in a setting information management server, and provides service for automatically setting up required configurations.

As the number of home network users increases, more users are requesting for customized application type home network management systems, not a standard type home network management system of the provider.

However, it is virtually impossible for the provider to learn all of the application types of the home network management system meeting various needs of the users. Even if the provider can learn every application type, it takes long time to standardize and provide the application types.

Also, if the provider standardizes the application type home network management system in response to demands of a minority, the production cost increases. Inevitably, setting information associated with configurations of a home network that the providers can standardize fails to meet requirements of the users.

SUMMARY

Therefore, an object of the present invention is to provide a system and method for automatically setting up configurations of a home network capable of efficiently sharing setting information associated with configurations of an application type home network of an individual home where the home network is installed.

Another object of the present invention is to provide a system and method for automatically setting up configurations of a home network capable of automatically setting or updating setting information associated with configurations of a home network related to a device, a network interface, a service and a system.

To achieve these and other advantages and in accordance with the purpose(s) of the present invention as embodied and broadly described herein, an apparatus a system for automatically setting up configurations of a home network in accordance with an aspect of the present invention includes: a setting information manager, placed within an individual home, for collecting and managing setting information associated with configurations of the home network, wherein the setting information manager shares the setting information with a remote setting information management server or another setting information manager.

To achieve these and other advantages and in accordance with the purpose(s) of the present invention, a system for automatically setting up configurations of a home network to manage home network home group in accordance with another aspect of the present invention includes: a setting information table for storing an error management record and setting information collected from at least one setting information manager within an individual home; a standard setting information generating unit for generating standard setting information for each home network configuration from the setting information table; and a transmission unit for transmitting properly selected standard setting information according to an inquiry of the setting information manager.

To achieve these and other advantages and in accordance with the purpose(s) of the present invention, a method for automatically setting up configurations of a home network in accordance with another aspect of the present invention includes: initializing a management system within a home network of an individual home; recognizing the initialized home network configurations; determining whether initial setting information is present; inquiring presence of setting information to a setting information management server or a setting information manager of another home if the determination indicates that the initial setting information is not present; acquiring the corresponding setting information from the setting information management server or the setting information manager of another home; and automatically setting up home network configurations according to the acquired setting information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
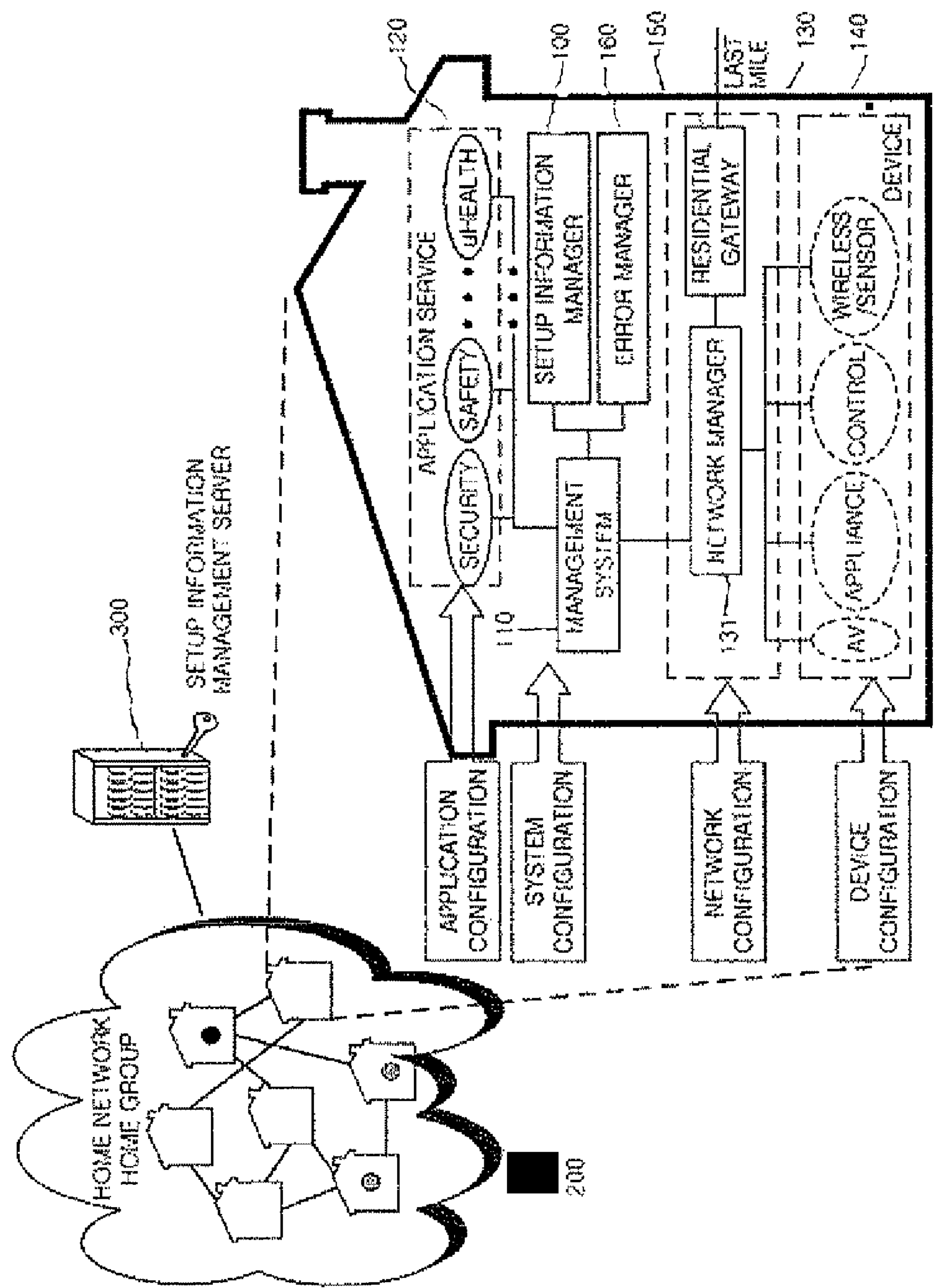
FIG. 1 is a view illustrating a system for automatically setting up configurations of a home network according to an embodiment of the present invention.

FIG. 1 is a view illustrating a system for automatically setting up configurations of a home network according to an embodiment of the present invention. As shown in FIG. 1, a home network of an individual home basically includes a device 140, a network 130, an application service 120, and a management system 110. The system for automatically setting up configurations of the home network according to the embodiment of the present invention further includes a setting information manager 100, and an error manager 160. The setting information manager 100 collects and manages setting information associated with configurations of the home network. The error manager 160 informs the setting information manager 100 of home network error information and a user's error management detail.

The device 140 within the home network is a digital electronic appliance connected to a network and managed by the management system 110. Examples of the digital electronic appliance may include a PC, a digital television, a digital video player, a digital video disc (DVD) player, an air conditioner, a security camera, and lighting.

The network 130 within the home network may be various wired/wireless networks, network equipment, and a modem managed by the network manager 131.

The wire/wireless network may be a telephone line, a power line, IEEE1394 or the like, which connects a plurality of devices 140.

Besides, a residential gateway 150 connecting an external setting information management server 300 and the home network is included in the network 130 within the home network.

The application server 120 within the home network is an application program installed and used in the device 140 or a system 103 within the home network.

For example, the application service 120 may be, e.g., Explorer, Word program, and Photoshop installed in a PC.

The home network management system 110 is software that manages overall operation of the home network, which includes the device 140, the network 130 and the application service 120 within the home network.

The setting information manager 100 collects or manages setting information associated with configurations of the home network, and shares setting information with the setting information management server 300 and/or between setting information managers 100.

The error manager 160 recognizes a home network error, informs a user of the error, and reports error information and a user error management detail to the setting information manager 100.

The error information and the user error management detail may be stored in an error management record storage unit 205 within the setting information manager 100.

Figure 2:
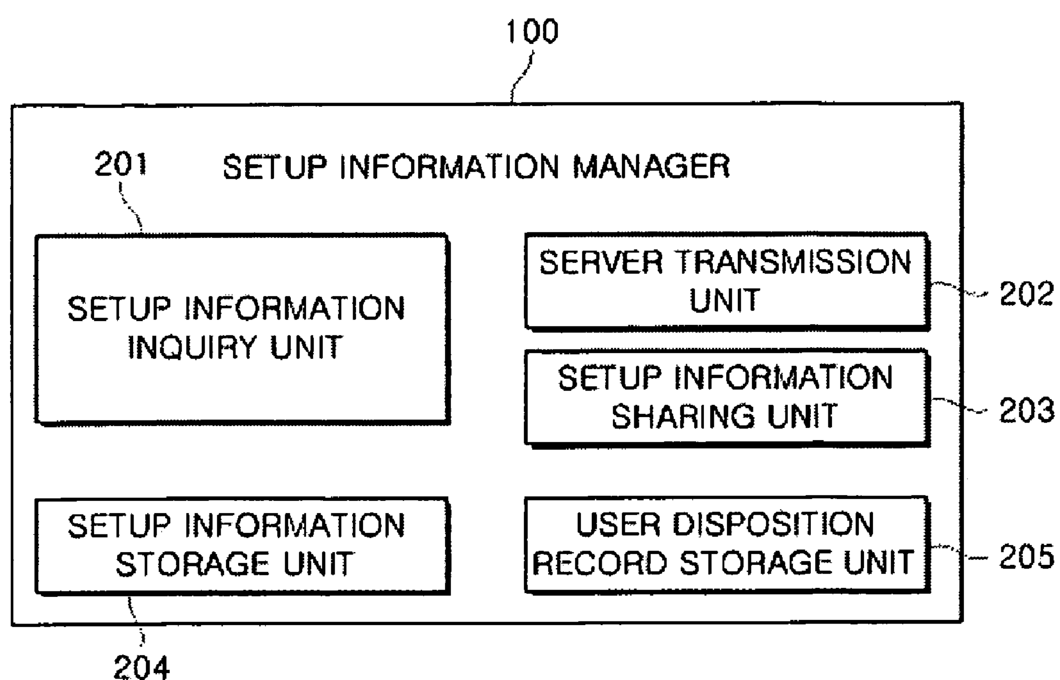
FIG. 2 is a block diagram of a setting information manager according to the embodiment of the present invention.

FIG. 2 is a block diagram of the setting information manager 100 according to the embodiment of the present invention. As shown in FIG. 2, the setting information manager 100 includes a setting information storage unit 204, the user error-management record storage unit 205, a setting information inquiry unit 201, a server transmission unit 202, and a setting information sharing unit 203. The setting information storage unit 204 stores setting information and a list of the device 140, the network, the management system 110 and the application server 120 within the home network. The user error-management record storage unit 205 records error information and a user's error management detail. The setting information inquiry unit 201 inquiries required setting information to an external device right after initialization or in occurrence of a configuration change. When setting information is changed or a new disposition record is generated, the server transmission unit 202 transmits the setting information and the error management record to the setting information management server 300. The setting information sharing unit 203 allows a setting information manager 100 within another home to access the set information and the error management record.

The setting information inquiry unit 201 inquiries the presence of home network configuration setting information to an individual home.

The setting information storage unit 204 stores setting information and a list or configurations of the device 140, the network 130, the application service 120 and the management system 110 within the home network.

For example, setting information of the device 140 may be, e.g., a channel of a digital television, a basic temperature of an air conditioner, or brightness of lighting. Setting information of the network 130 may be, e.g., a QoS parameter or an available band of a wired/wireless network including a power line, a telephone network and IEEE1394.

For example, setting information of the application service 120 may be, e.g., a default homepage of an Internet browser, a channel of an Internet protocol (IP) TV, a pleasant temperature range of a pleasant temperature service, or a camera resolution. Setting information of the management system 110 may be, e.g., a system version or a patch.

The user disposition record storage unit 205 stores error contents and user's error management details.

In detail, when a user properly manages an error recognized and warned by the error manager 160, the user error-management record storage unit 205 may store error contents and user error-management records.

The server transmission unit 202 uploads the setting information stored in the user disposition record storage unit 205 and the setting information storage unit 204 to the setting information management server 300.

The setting information sharing unit 203 shares the setting information stored in the user error-management record storage unit 205 and the setting information storage unit 204 so that a setup information manager 100 of another home can use it.

Figure 3:
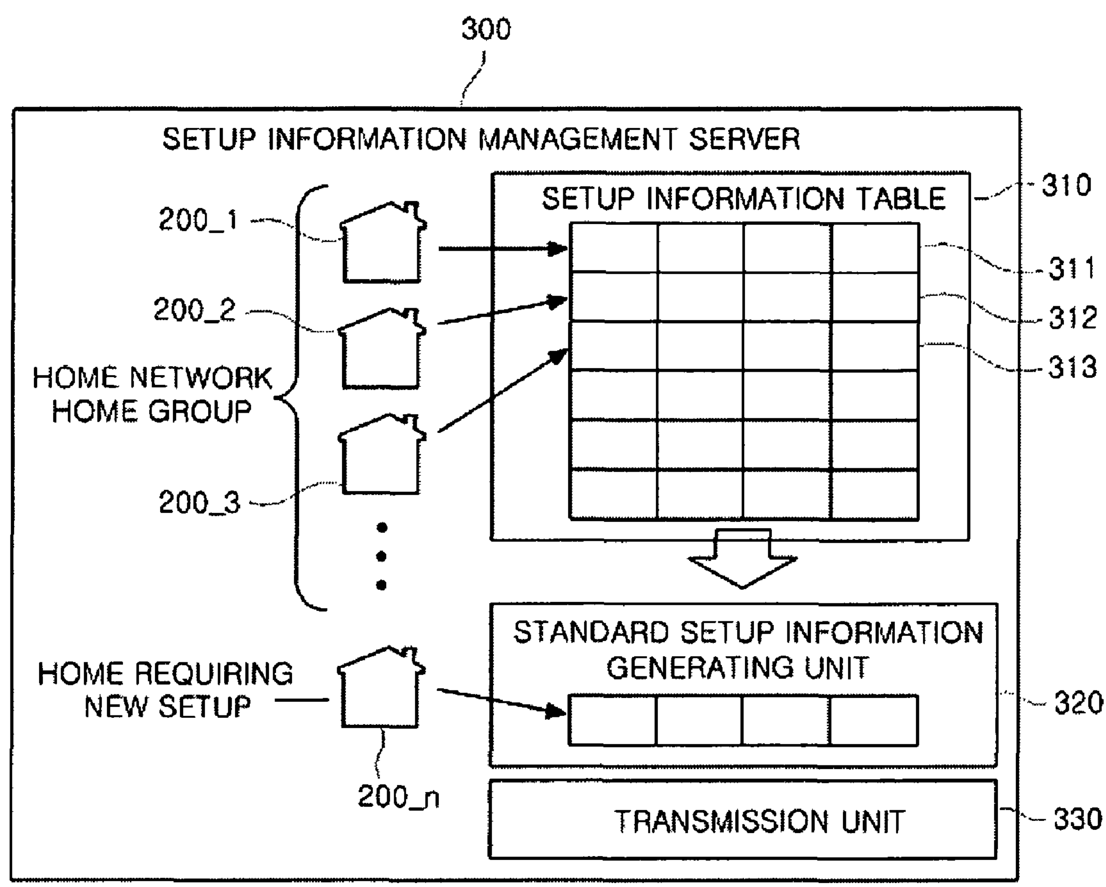
FIG. 3 is a block diagram of a setting information management server according to the embodiment of the present invention.

FIG. 3 is a block diagram of the setting information management server 300 according to the embodiment of the present invention. As shown in FIG. 3, the setting information management server 300 includes a setting information table 310, a standard setting information generating unit 320, and a transmission unit 330. The setting information table 310 stores setting information and a disposition record collected from at least one setting information manager 100. The standard setting information generating unit 320 generates standard setting information for each home network configuration on the basis of the setting information table 310. The transmission unit 330 transmits properly selected standard setting information according to inquiry of the setting information manager 100.

The setting information management server 300 is a server that stores and manages setting information about a home network home group 200 including at least one home network.

The setting information table stores the setting information and an error-management record collected from the setting information manager 100 by each individual home.

For example, if the setting information table 310 stores information for each individual home for each cell number, the setting information table 310 may store and manage setting information of home 1 200_1 in cell 1 311, and setting information of home 2 200_2 in cell 2 312.

The standard setting information generating unit 320 generates standard setting information for each home network configuration from the setting information stored in the setting information table 310.

The standard setting information may be acquired according to at least one reference of a mean value and a maximum value of the setting information stored in the setting information table 310.

The transmission unit 330 transmits properly selected standard setting information according to an inquiry of the setting information manager 100.

In detail, the transmission unit 330 transmits to the setting information table 310, information received from the setting information storage unit 204 within the setting information manager 100 of an individual home. Also, the transmission unit 330 searches for setting information requested by the setting information inquiry unit 210 from the standard setting information to transmit the searched setting information to the setting information manager 100.

Figure 4:
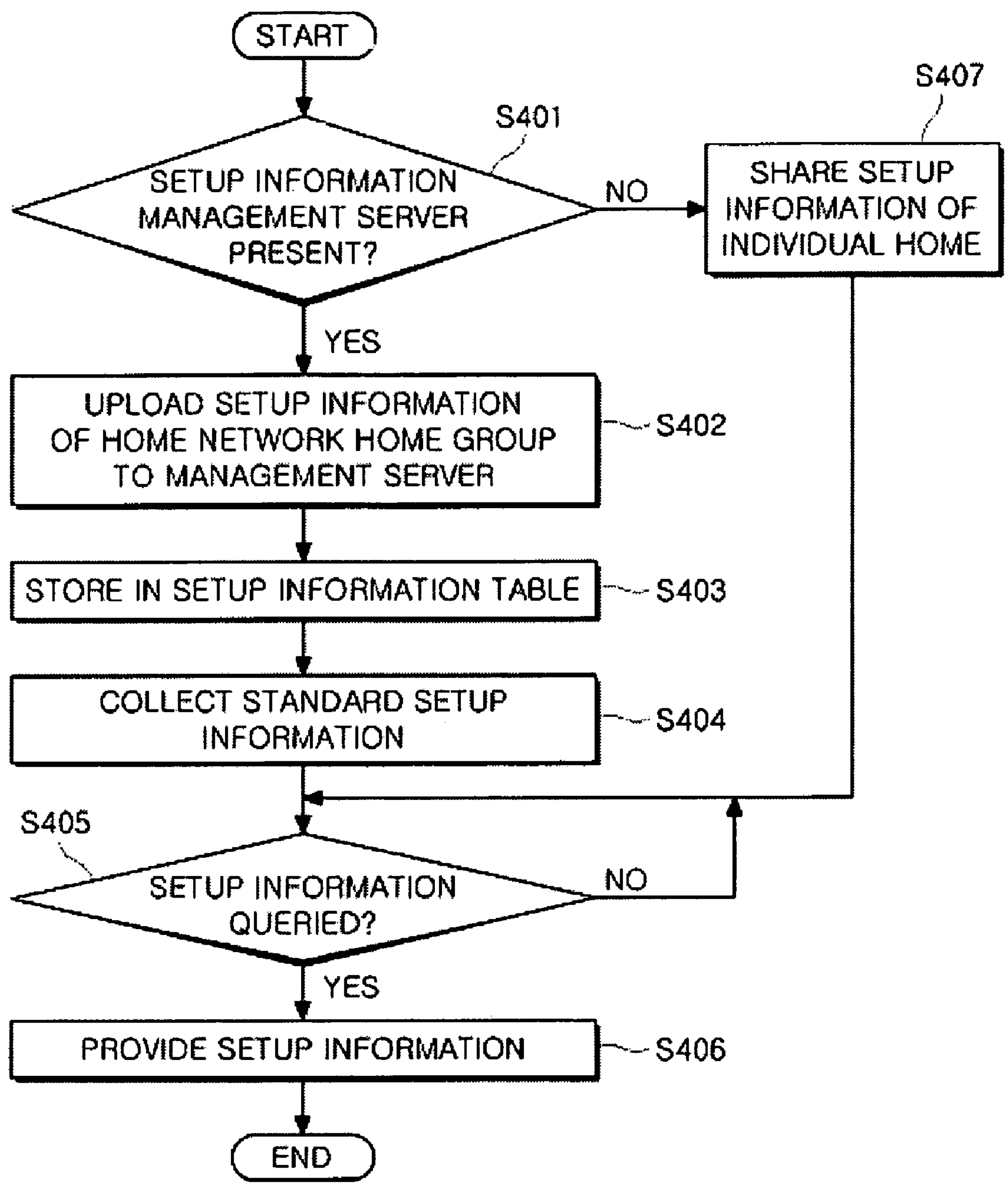
FIG. 4 is a flowchart of a method for sharing setting information of a home network home group according to the embodiment of the present invention.
Figure 5:
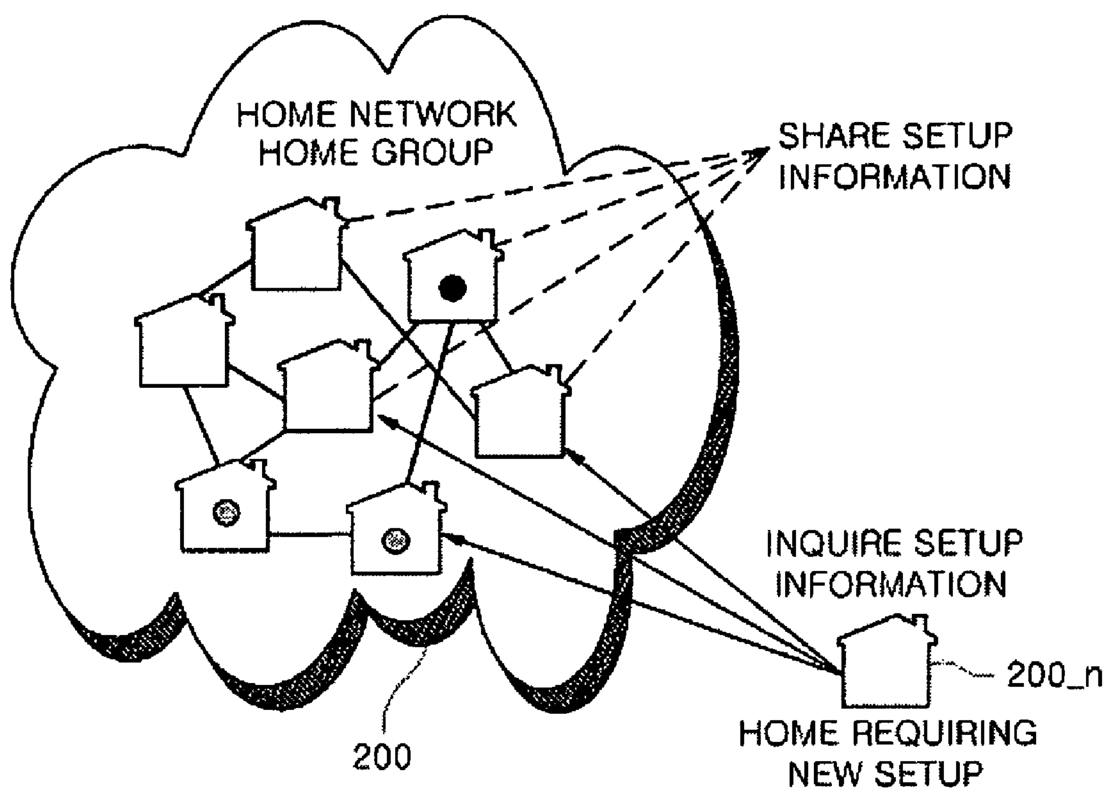
FIG. 5 is a block diagram of a home network home group that shares setting information by peer-to-peer (P2P) according to the embodiment of the present invention.

FIG. 4 is a flowchart of a method for sharing setting information of a home network home group according to the embodiment of the present invention, and FIG. 5 is a block diagram of a home network home group that shares setting information by peer-to-peer (P2P) according to the embodiment of the present invention. The flowchart of FIG. 4 will now be described, also referring to the block diagram of FIG. 5.

If the setting information management server 300 exists in a system for automatically setting up configurations of a home network in operation S401, setting information of an individual home is managed by the setting information management server 300.

To this end, in operation S402, the server transmission unit 202 of an individual home uploads setting information stored in the setting information storage unit 204 and a user error-management record storage unit 205 to the setting information management server 300.

In operation S403, the setting information management server 300 classifies the uploaded setting information of the individual home, and stores the classified setting information in a setting information table 310.

In operation S404, a standard setting information generating unit 320 collects setting information stored in the setting information table 310, and creates standard setting information.

The standard setting information may be set by any one reference of a mean value and a maximum value of setting information pieces stored in the setting information table 310.

For example, there will be described a case where the setting information management server 300 manages a target temperature of setting information of air conditioners of three homes of a home network home group 200.

The setting information management server 300 manages the air conditioners as the device 140 of the setting information table 310, and a target temperature as the setting information. As detailed items of the setting information table 310, 24° C. which is a setting temperature of home 1 200_1 is stored in cell 1 311, 25° C. which is a setting temperature of home 2 200_2 is stored in cell 2 312, and 27° C. which is setting temperature of home 3 200_3 is stored in cell 3 313.

If a generation reference of standard setting information is set to a mean value, the setting information management server 300 sets standard setting information to 25.33° C., which is the mean value of the home 1 311, the home 2 312 and the home 3 313.

As shown in FIG. 5, the system for automatically setting up configurations of a home network by P2P shares setting information associated with configurations of the home network with another home via a setting information sharing unit 203 of the individual home.

That is, the setting information sharing unit 203 of the individual home shares setting information stored in the setting information storage unit 204 and the user error-management record storage unit 205 with another home by P2P.

Thereafter, if a home 200_*n* requiring new setup inquiries the presence of desired setting information in operation S405, search for the setting information shared by the setting information management server 300 or between setting information managers 100 is performed.

If the corresponding setting information is present in operation S405, the home 200_*n* which needs new setup receives the searched setting information from the setting information management server 300 or the setting information manager 100 of the individual home in operation S406.

Thereafter, the home 200_*n* which needs new setup sets the provided setting information to use a desired function.

Figure 6:
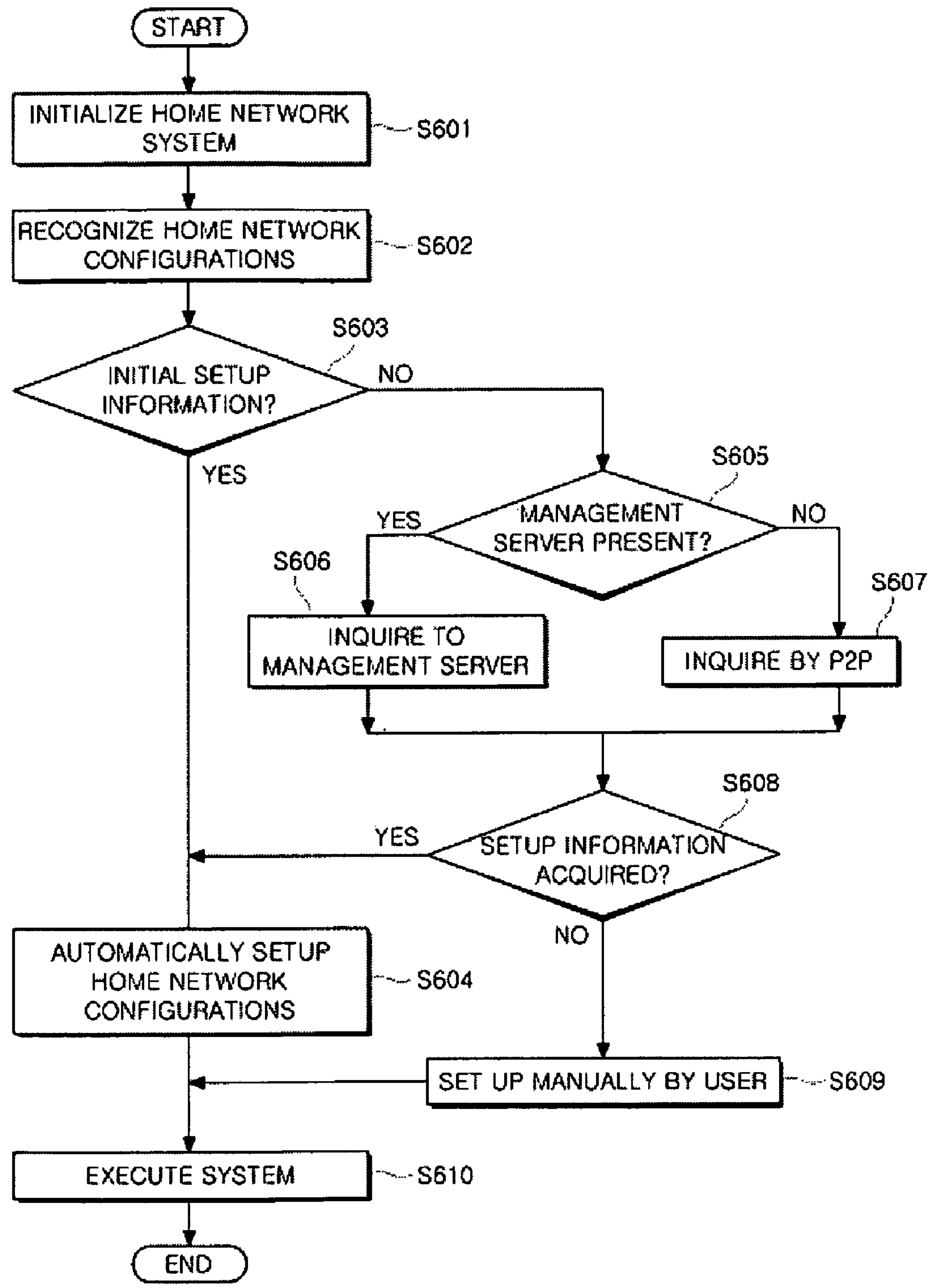
FIG. 6 is a flowchart sequentially illustrating operations of the system for automatically setting up configurations of a home network according to the embodiment of the present invention.

FIG. 6 is a flowchart sequentially illustrating operations of the system for automatically setting up configurations of a home network according to the embodiment of the present invention.

Referring to FIG. 6, in operation S601, the management system 110 that manages the device 140, the application service 120 and the network 130 within a home network is initialized.

In operation S602, the management system 110 recognizes setting information and configurations or a list of the device 140, the network 130, the management system 110 and the application service 120 within the home network.

The device 140 may be a device that is connected in the home network, such as a digital television, an air conditioner, a security camera, or lighting. The setting information may be a channel of the digital television, a default temperature of the air conditioner, or brightness of the lighting.

Also, the network 130 is a network device such as a power line, a telephone network, IEEE1394, a wireless interface network, network equipment, and a modem connected with the device 140. Setting information of the network 130 may be, e.g., a QoS parameter or an available band of the network.

The application service 120 is a service such as an installed executable service and an expected service to be installed by downloading. Setting information of the application service 120 may be, e.g., a default homepage of the Internet browser, a channel of an IPTV, a pleasant temperature range of a pleasant temperature service, or a camera resolution of a security service.

The management system 110 is software that manages overall operation of the home network, and setting information of the management system 110 may be, e.g., a system version or a patch.

If initial setting information is present in an initialized home network system in operation S603, then a home network configuration setup is performed automatically in operation S604.

If the initial setting information is not present in operation S603, the home network system searches and acquires setting information of the device 140, the application service 120, the network 130 and the management system 110.

If a setting information management server 300 is present in operation S605, the home network system of an individual home inquiries whether the setting information management server 300 includes a list of required setting information.

If the setting information management server 300 is not present in operation S605, the home network system of an individual home inquiries whether required setting information is present in another home by P2P in operation S607.

The P2P means that setting information is inquired between setting information managers 100 of individual homes.

If the home network system succeeds in searching the required setting information, the home network system tries to acquire the corresponding setting information from the setting information management server 300 or the setting information manager 100 of the individual home.

If the home network system succeeds in acquiring the setting information in operation S608, the home network system sets up configurations of the home network automatically by using the acquired setting information in operation S604.

In contrast, if the home network system fails to acquire the setting information in operation S608, it informs a user that configurations of the home network cannot be set up automatically.

Then, in operation S609, the user manually sets setting information required to use a desired function of the home network system.

In operation S610, the management system 110 that manages the home network system is executed according to the setting information established manually or automatically.

Figure 7:
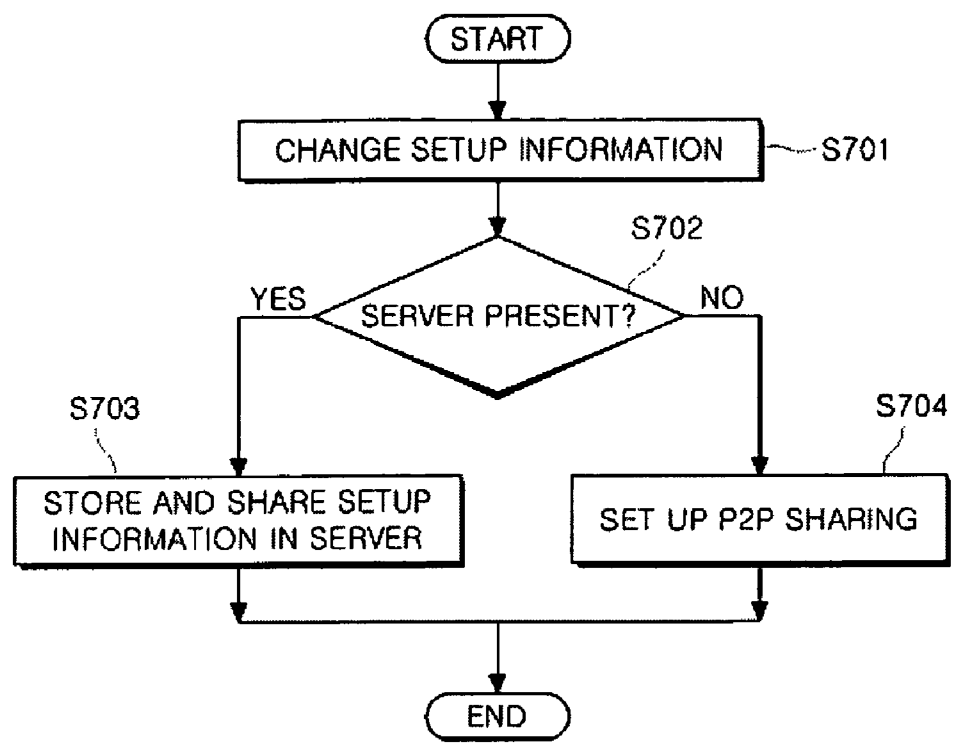
FIG. 7 is a flowchart of a method for updating setting information of a home network according to the embodiment of the present invention.

FIG. 7 is a flowchart of a method for updating setting information of a home network according to the embodiment of the present invention.

Referring to FIG. 7, in operation S701, home network setting information is changed in operation of a home network management system. Then, the changed setting information is stored in a setting information storage unit 204.

If a setting information management server 300 that manages a home network is present in operation S702, setting information stored in the information storage unit 204 and the user error-management record storage unit 205 of an individual home is uploaded to the setting information management server 300 through the server transmission unit 202, and is shared in operation S703.

In contrast, the setting information management server 300 is not present in operation S702, the setting information of the setting information storage unit 204 is shared with a home network home group via the setting information sharing unit 203 by P2P in operation S704.

In the system and method for automatically setting up configurations of a home network according to the embodiments of the present invention, customized setting information for an individual home is shared in a home network management system where various devices are installed, so that setting information of home network configurations can be effectively managed.

Also, automatic setup of the home network configurations is supported by using information shared by individual users, thereby reducing costs and efforts required for maintenance and repair of the home network.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A system for automatically setting up configurations of a home network, the system comprising:

a setting information managing device, placed within an individual home, for collecting and managing setting information associated with configurations of the home network, wherein the setting information managing device shares the setting information with a remote setting information management server or another setting information managing device, wherein the setting information manager device comprises:

a setting information storage unit for storing setting information and a list of a device, a network, a management system and an application service within the home network;

a user error-management record storage unit for recording error information and user's error management details on an error;

a setting information inquiry unit for inquiring required setting information to an external device right after initialization of the management system or in occurrence of configuration change;

a server transmission unit for transmitting the setting information and an error management record to the setting information management server when the setting information is changed or a new error management record is generated; and a setting information sharing unit for allowing a setting information managing device within another home to access the setting information and the error management record.

2. The system of claim 1, further comprising an error managing device to recognize an error of a home network, to inform a user of the error, and to report error information and user's error management details to the setting information manager device.

3. The system of claim 1, wherein the device comprises a computer, a digital television, an air conditioner, a digital video disc (DVD) player, lighting, and a security camera.

4. The system of claim 1, wherein the network within the home network comprises a power line, a wired/wireless interface network of the home network including IEEE1394, network equipment, and a modem.

5. The system of claim 1, wherein the application service within the home network comprises an Internet browser service, an Internet protocol television (IPTV) service, a residential environment control service, and a security service.

6. The system of claim 1, further comprising a home network management system for managing overall operation of the home network.

7. A setting information management server for automatically setting up configurations of a home network to manage a home network home group, the server comprising:

a setting information storage unit for storing setting information and a list of a device, a network, a management system and an application service within the home network;

a user error-management record storage unit for recording error information and user's error management details on an error;

a setting information inquiry unit for inquiring required setting information to an external device right after initialization of the management system or in occurrence of configuration change;

a server transmission unit for transmitting the setting information and an error management record to the setting information management server when the setting information is changed or a new error management record is generated; and a setting information sharing unit for allowing a setting information managing device within another home to access the setting information and the error management record.

8. A method for automatically setting up configurations of a home network, the method comprising:

initializing a management system within a home network of an individual home;

recognizing the initialized home network configurations;

determining whether initial setting information is present;

inquiring presence of setting information to a setting information management server or a setting information manager of another home if the determination indicates that the initial setting information is not present;

acquiring the corresponding setting information from the setting information management server or the setting information manager of another home;

automatically setting up home network configurations according to the acquired setting information;

storing setting information and a list of a device, the management system and an application service within the home network;

recording error information and user's error management details on an error;

inquiring required setting information to an external device right after initialization of the management system or in occurrence of configuration change;

transmitting the setting information and an error management record to the setting information management server when the setting information is changed or a new error management record is generated; and allowing a setting information managing device within another home to access the setting information and the error management record.

9. The method of claim 8, further comprising, if the acquiring of the corresponding setting information fails:

displaying a manual setup request message to a user; and setting up the home network configurations on the basis of setting information input by the user.

10. The method of claim 8, further comprising, if the home network configurations of the individual home and the setting information are changed after the acquiring of the corresponding setting information:

storing the setting information changed in the individual home; and sharing the changed setting information between the setting information managers or via the setting information management server.

11. A method for automatically setting up configurations of a home network, the method comprising:

receiving setting information stored in a home network of an individual home;

storing the received setting information in a setting information table;

generating standard setting information for each home network configuration from the setting information table;

storing setting information and a list of a device, a management system and an application service within the home network;

recording error information and user's error management details on an error;

inquiring required setting information to an external device right after initialization of the management system or in occurrence of configuration change;

transmitting the setting information and an error management record to the setting information management server when the setting information is changed or a new error management record is generated; and allowing a setting information managing device within another home to access the setting information and the error management record.

12. The method of claim 11, wherein the generating of the standard setting information comprises acquiring the standard setting information according to one reference of a mean value and a maximum value of setting information stored in the setting information table.

13. The method of claim 11, wherein the setting information is managed separately according to a device, a network, a management system and an application service installed within the home network.

* * * * *